United States Patent [19]
Yang

[11] Patent Number: 5,701,237
[45] Date of Patent: Dec. 23, 1997

[54] SWITCHING POWER SUPPLY

[75] Inventor: Jun Hyun Yang, Suwon, Rep. of Korea

[73] Assignee: Samsung Electronics Co., Ltd., Kyungki-do, Rep. of Korea

[21] Appl. No.: 534,569

[22] Filed: Sep. 27, 1995

[30] Foreign Application Priority Data

Oct. 5, 1994 [KR] Rep. of Korea .................. 94-25399

[51] Int. Cl.⁶ ............................................ H02M 3/335
[52] U.S. Cl. ........................................... 363/20; 363/16
[58] Field of Search ........................... 363/16, 20, 21, 363/95, 97, 131

[56] References Cited

U.S. PATENT DOCUMENTS

| | | | |
|---|---|---|---|
| 4,257,087 | 3/1981 | Cuk | 363/16 |
| 4,734,839 | 3/1988 | Barthold | 363/16 |
| 4,857,822 | 8/1989 | Tabisz et al. | 363/16 X |
| 5,442,534 | 8/1995 | Cuk et al. | 363/16 |
| 5,528,482 | 6/1996 | Rozman | 363/21 |

OTHER PUBLICATIONS

Nikkei Electronics ASIA/Aug. 1994; Technology Trend; "Harmonics Fighters Pursue Choke-Coil, One-Converter Power Supplies"; Katsumi Yamashita; pp. 44-47.

*Primary Examiner*—Peter S. Wong
*Assistant Examiner*—Y. J. Han
*Attorney, Agent, or Firm*—Sughrue, Mion, Zinn, Macpeak & Seas, PLLC

[57] ABSTRACT

A switching power supply comprising an inductance device having one electrode connected to an output terminal of a rectifier, the rectifier rectifying an alternating current voltage, a switching device connected between another electrode of the inductance device and a ground voltage source, a capacitive device having one electrode connected to the other electrode of the inductance device, and a transformer having a primary coil connected to the other electrode of the capacitive device. The inductance device may be a choke coil. The switching device may be a field effect transistor. The capacitive device may be a capacitor. The transformer may include one or two secondary coils.

17 Claims, 5 Drawing Sheets

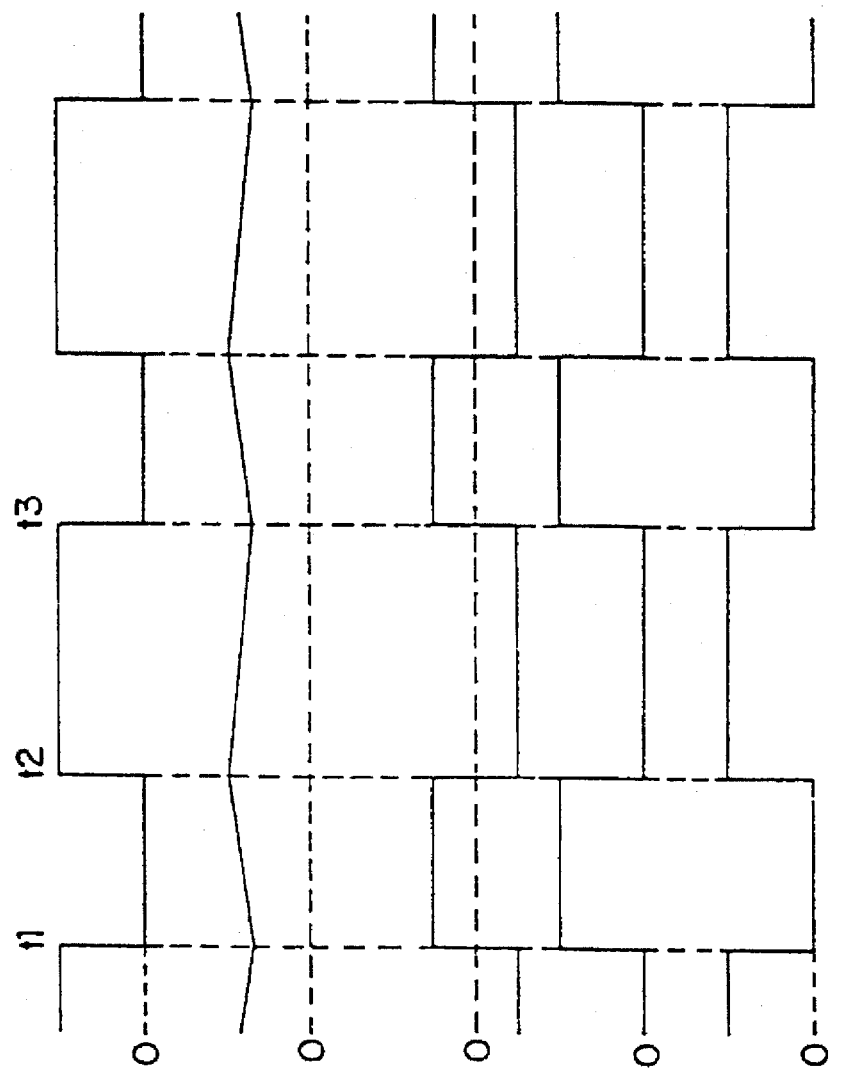

SWITCHING POWER SUPPLY

BACKGROUND OF THE INVENTION

1. Field of the Invention

The present invention relates in general to switching power supplies, and more particularly to a switching power supply for converting input alternating current (referred to hereinafter as AC) power to direct current (referred to hereinafter as DC) power.

The present application of a switching power supply, is based on Korean Application No. 94-25399 which is incorporated herein by reference for all purposes.

2. Description of the Prior Art

Electronic appliances such as television sets, personal computers, etc. generally employ a switching power supply for converting AC power, externally input, into DC power. Recently, these switching power supplies have been required to suppress a harmonic current and reduce power consumption. The harmonic current results from distortion of a power line current waveform in the switching power supply. In order to prevent such distortion, separate circuit components have been required to be used in switching power supplies. A standard value for such a harmonic current has been specified in every country, based on the International Electrotechnical Commission (IEC) standard (IEC1000-3-2). However, in general, separate circuit components must be added in order to achieve the harmonic current standard value. Addition of these separate circuit components results in an increase in cost of the electronic appliance, and a loss in conversion efficiency. Further, compulsory reduction in power consumption of devices, such as switching power supplies, is intended to reduce the amount of carbon dioxide ($CO_2$) discharged from power generation sources.

FIGS. 1A to 1C are circuit diagrams of conventional switching power supplies.

The conventional switching power supply shown in FIG. 1A is a forward type switching power supply, which is the most general type of switching power supply. This conventional switching power supply comprises a rectifier R1 for converting an AC input voltage into a DC voltage. Also, a choke coil L1 and a capacitor C1 are adapted to smooth the ripple component of the DC voltage output from rectifier R1. The choke coil L1 is desirable to enhance the power factor, but has the disadvantage that it requires high inductance, because the ripple component has a frequency corresponding to a commercial power line frequency. The capacitor C1 performs the function of holding a voltage level upon the occurrence of an instantaneous commercial power interruption.

When the switching transistor M1 is turned on, the DC voltage smoothed by choke coil L1 and capacitor C1, is applied to a primary coil of transformer T1, thereby causing a voltage to be induced in a secondary coil of transformer T1. The voltage induced in the secondary coil of transformer T1 is converted into a DC voltage by a rectifying diode D6. Then, a filtering choke coil L2 and a filtering capacitor C2 smooth a ripple component of the DC voltage at the rectifying diode D6. A fly-wheel diode D7 functions to allow the current to continuously flow through the filtering choke coil L2.

The conventional switching power supply shown in FIG. 1B has the same structure as that of the circuit shown in FIG. 1A, with the exception that it further comprises a boost converter. The boost converter includes choke coil L1, a boost switching transistor M2, a boost rectifying diode D8 and capacitor C1. The boost switching transistor M2 is switched at a high frequency. This high-frequency switching operation of the boost switching transistor M2 has the effect of making the capacity of the choke coil L1 very small, while sufficiently coping with the harmonic current standard requirement, as compared with the circuit shown in FIG. 1A. However, addition of boost switching transistor M2 and boost rectifying diode D8 results in a reduction in the efficiency of the switching power supply.

The conventional switching power supply shown in FIG. 1C has been proposed by Origin Electric Co. Ltd., Korea. This conventional switching power supply has the same construction as that of FIG. 1B, except that the boost switching transistor M2 is omitted, and the switching transistor M1 performs the combined function of both switching transistors M1 and M2 of FIG. 1B. The conventional switching power supply shown in FIG. 1C has the advantage that it comprises only a single switching device M1 and a simple control circuit therefor. However, similar to the structure of the circuit shown in FIG. 1B, addition of the boost rectifying diode D8 results in a reduction in efficiency.

SUMMARY OF THE INVENTION

Therefore, the present invention has been made in view of the above problems, and it is an object of the present invention to provide a switching power supply with a simple circuit structure which can provide a high power factor.

It is another object of the present invention to provide a switching power supply with a simple circuit structure which is capable of suppressing generation of a harmonic current.

It is still a further object of the present invention to provide a switching power supply with a simple circuit structure which can provide high efficiency.

In accordance with the present invention, the above and other objects can be accomplished by a switching power supply comprising an inductance means having one electrode connected to an output terminal of a rectifier, said rectifier rectifying an alternating current voltage; switching means connected between another electrode of said inductance means and a ground voltage source; capacitive means having one electrode connected to said other electrode of said inductance means; and transforming means having a primary coil connected to the other electrode of said capacitive means.

BRIEF DESCRIPTION OF THE DRAWINGS

The above and other objects, features and advantages of the present invention will be more clearly understood from the following detailed description taken in conjunction with the accompanying drawings, in which:

FIG. 6 is a waveform diagram of voltages and currents measured at various components of the circuit shown in FIG. 5.

DETAILED DESCRIPTION OF THE PREFERRED EMBODIMENTS

Figure 2:
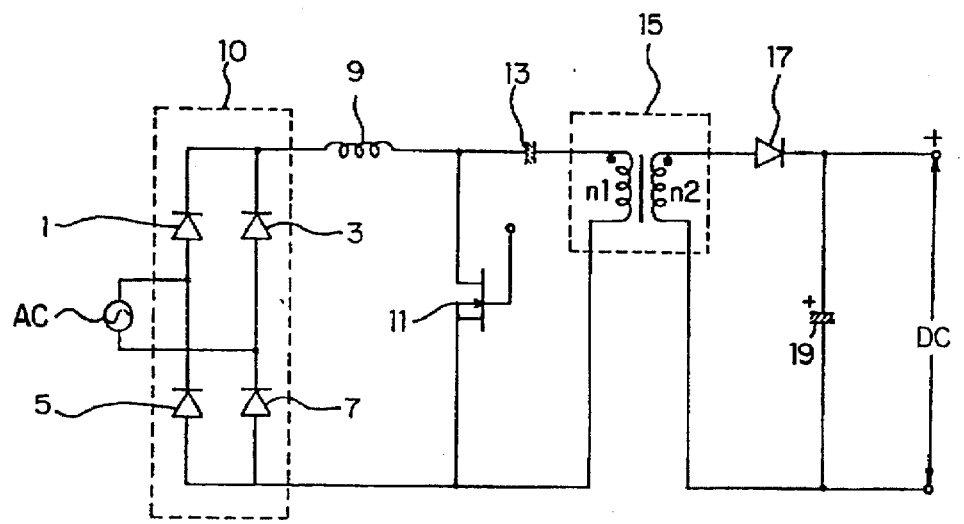
FIG. 2 is a circuit diagram of a switching power supply in accordance with a first embodiment of the present invention.

Referring to FIG. 2, a circuit diagram of a switching power supply is shown according to a first embodiment of the present invention. In this embodiment, the switching power supply is a ringing choke type switching power supply. As shown in FIG. 2, the switching power supply comprises a primary rectifier 10 for rectifying an AC voltage. The primary rectifier 10 includes a plurality of diodes 1, 3, 5 and 7. A choke coil 9 has one electrode connected to an output terminal of the primary rectifier 10 and another electrode connected to a drain of a switching transistor 11, which is, for example, an n channel type-junction field effect transistor. The switching transistor 11 has a source connected to a ground terminal and a gate connected to an output terminal of a pulse width modulator (not shown). The pulse width modulator outputs, to the gate of the switching transistor 11, a pulse signal having a desired width. A capacitor 13 has one electrode connected to the other electrode of the choke coil 9 and the other electrode of capacitor 13 is connected to one side of a primary coil n1 of a transformer 15. The other side of transformer 15 is connected to the ground terminal. The transformer 15 has a secondary coil n2 connected between an anode of a rectifying diode 17 and a second ground terminal. A filtering capacitor 19 is connected between a cathode of the rectifying diode 17 and the second ground terminal. A DC voltage is produced across the filtering capacitor 19 when an AC voltage is input to rectifier 10.

Figure 3:
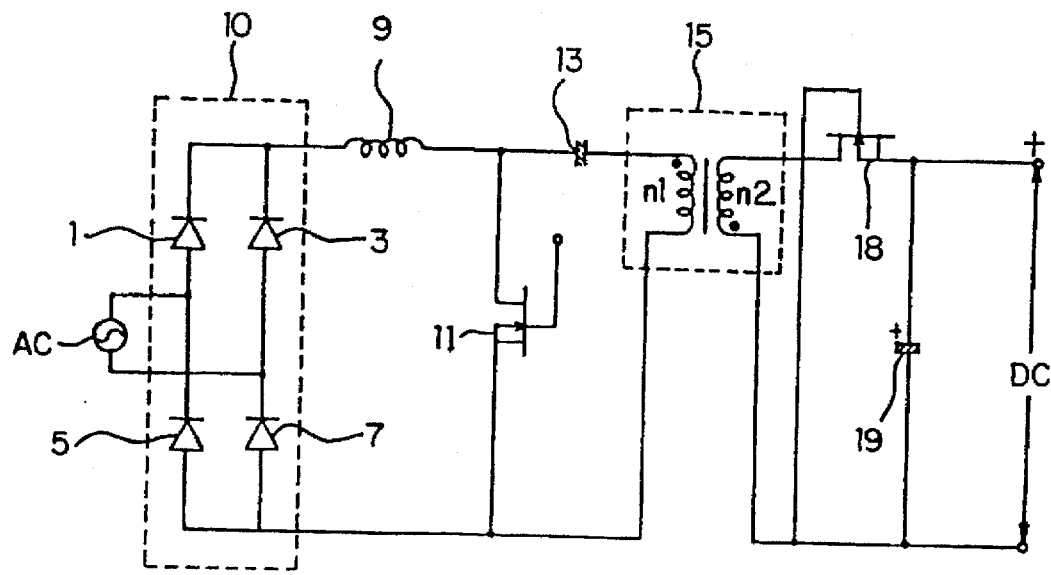
FIG. 3 is a circuit diagram of a switching power supply in accordance with a second embodiment of the present invention.

FIG. 3 shows a circuit diagram of a switching power supply according to a second embodiment of the present invention. As shown in FIG. 3, the structure of the second embodiment is the same as that of the first embodiment, except that a rectifying transistor 18 is employed in place of the rectifying diode 17, as the secondary rectifying means. The rectifying transistor 18 is, for example, an n channel type-junction field effect transistor. The rectifying transistor 18 has a drain connected to one side of the secondary coil n2 of the transformer 15, a source connected to a positive electrode of the filtering capacitor 19 and a gate connected to the second ground terminal together with the other side of the secondary coil n2 of the transformer 15.

Figure 1A:
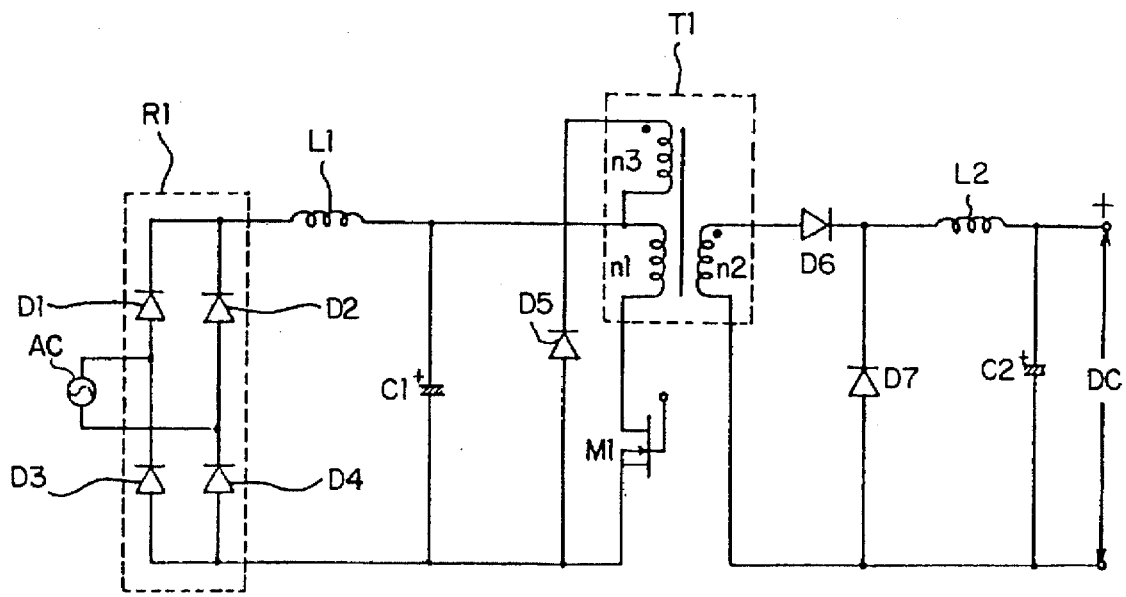
FIGS. 1A to 1C are circuit diagrams of conventional switching power supplies, respectively.
Figure 1B:
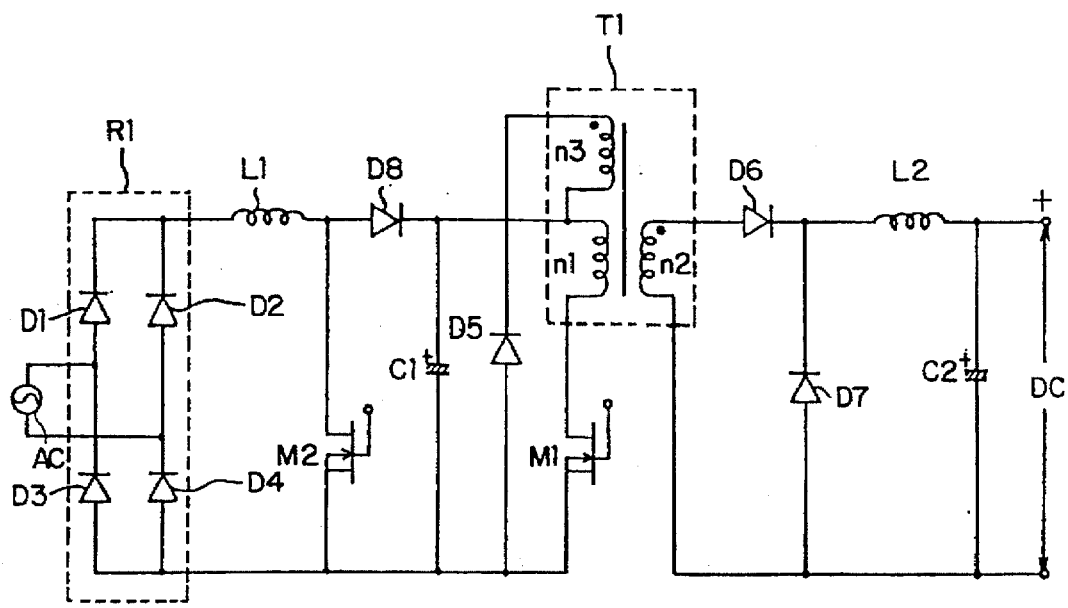
Figure 1C:
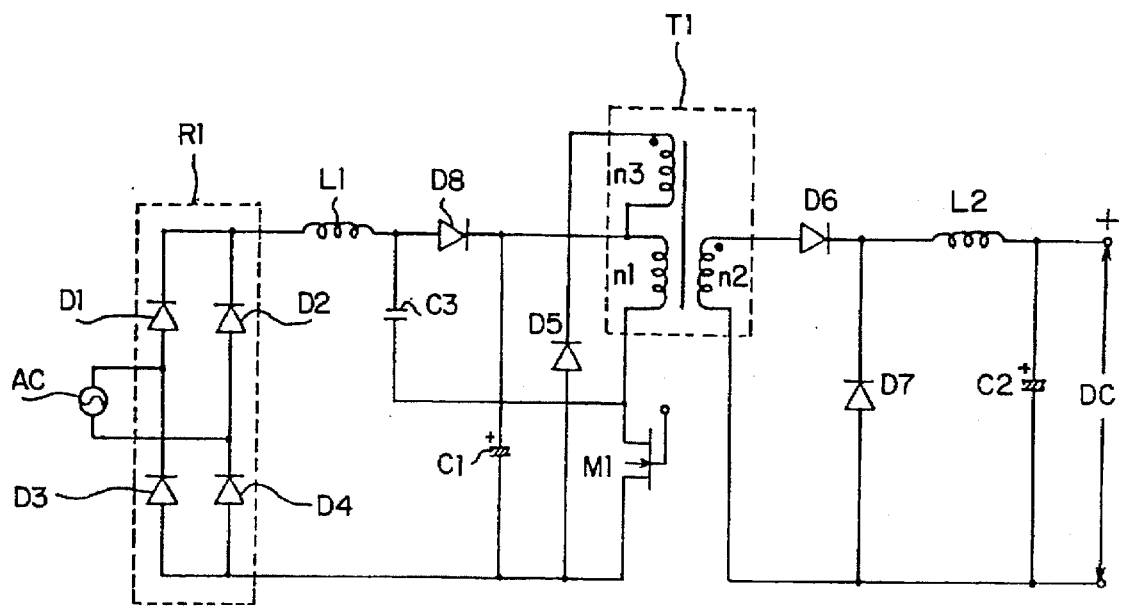

In FIG. 2, the switching transistor 11 is switched at a high frequency, so that the choke coil 9 has the same inductance and power factor as coil 9, shown in FIGS. 1A and 1B. Also, the switching transistor 11 is driven in the same manner as that of the switching transistor M1 shown in FIGS. 1A and 1B, to perform power factor enhancement and conversion operations. The rectifying operation is performed by a rectifying diode 17 in the circuit shown in FIG. 2, whereas it is performed by the rectifying transistor 18 in the circuit shown in FIG. 3.

The circuits shown in FIGS. 2 and 3 operate substantially the same as the circuits shown in FIGS. 4 and 5, and will be described later in detail.

Figure 4:
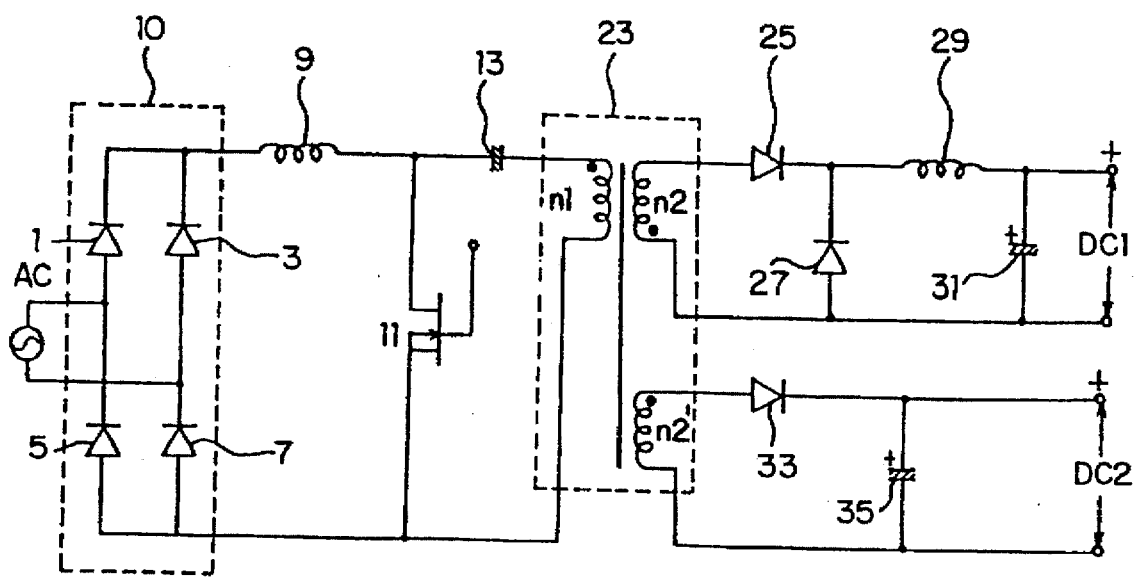
FIG. 4 is a circuit diagram of a switching power supply in accordance with a third embodiment of the present invention.

FIG. 4. shows a circuit diagram of a switching power supply according to a third embodiment of the present invention. In this third embodiment, the switching power supply is a forward type switching power supply. Since some of the devices shown in FIG. 4 are the same as those shown in FIGS. 2 and 3, like reference numerals designate like parts among the figures.

As shown in FIG. 4, the switching power supply comprises a transformer 23 having a primary coil n1, a first secondary coil n2 and a second secondary coil n2'. The structure of the primary coil n1 of the transformer 23 is the same as that shown in FIG. 2 or FIG. 3. The first secondary coil n2 of transformer 23 has one side connected to an anode of a first rectifying diode 25 and another side connected to an anode of a fly-wheel diode 27, and also connected to a second ground terminal. The first rectifying diode 25 and the fly-wheel diode 27 have cathodes connected in common to an electrode of a filtering choke coil 29. A first filtering capacitor 31 is connected between another electrode of the filtering choke coil 29 and a second ground terminal. A first DC voltage DC1 is produced across the first filtering capacitor 31. The second secondary coil n2' of the transformer 23 has one side connected to an anode of a second rectifying diode 33 and another side connected to a third ground terminal. A second filtering capacitor 35 is connected between a cathode of the second rectifying diode 33 and the third ground terminal. A second DC voltage DC2 is produced across the second filtering capacitor 35.

Figure 5:
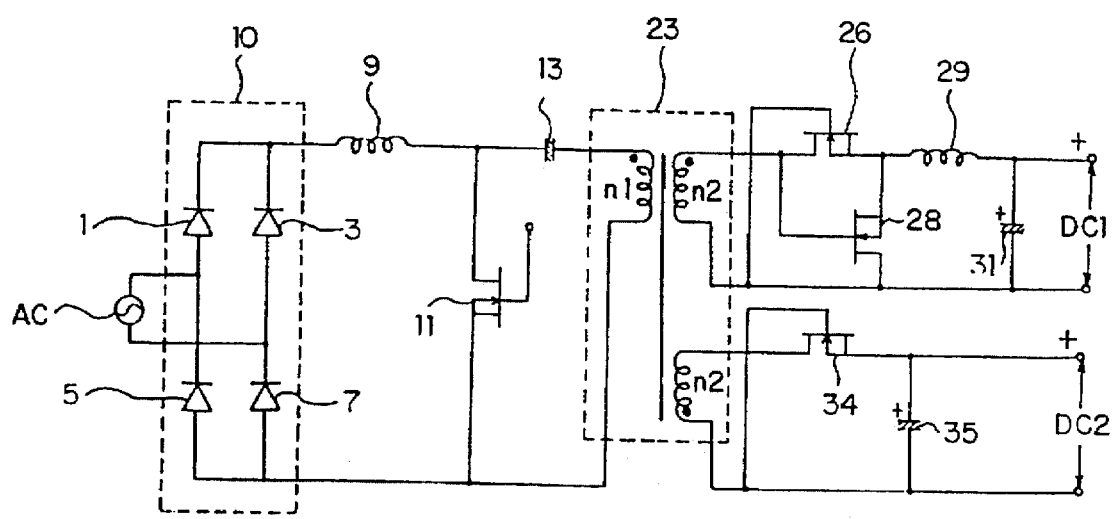
FIG. 5 is a circuit diagram of a switching power supply in accordance with a fourth embodiment of the present invention.

FIG. 5 shows a circuit diagram of a switching power supply according to a fourth embodiment of the present invention. As shown in FIG. 5, the structure of the fourth embodiment is the same as that of the third embodiment, except that first and second rectifying transistors 26 and 34, and a fly-wheel transistor 28 are employed in place of the first and second rectifying diodes 25 and 33 and the fly-wheel diode 27 of the circuit shown in FIG. 4, as the secondary rectifying means and the fly-wheel rectifying means, respectively. The first and second rectifying transistors 26 and 34 and the fly-wheel transistor 28 are, for example, n channel type-junction field effect transistors. The first rectifying transistor 26 has a drain connected to a first side of the first secondary coil n2 of transformer 23, a source connected to a first electrode of filtering choke coil 29 and a gate connected to a second ground terminal together with a second side of the first secondary coil n2 of transformer 23. The fly-wheel transistor 28 has a drain connected to the second ground terminal, a source connected to the source of the first rectifying transistor 26 and the first electrode of the filtering choke coil 29, and a gate connected to the first side of the first secondary coil n2 of transformer 23 and the drain of first rectifying transistor 26. The second rectifying transistor 34 has a drain connected to a first side of the second secondary coil n2' of the transformer 23, a gate connected to a third ground terminal together with a second side of the second secondary coil n2' of transformer 23, and a source connected to a positive electrode of the second filtering capacitor 35. First and second DC voltages DC1 and DC2 are produced across the first and second filtering capacitors 31 and 35, respectively, in a similar manner to those produced in the circuit shown in FIG. 4. In FIGS. 4 and 5, the rectifying circuit provided at the second secondary coil n2' of the transformer 23 functions to clamp a flyback voltage resulting from an excitation current of transformer 23.

The switching power supplies, having the above-described structures according to the various embodiments of the present invention, operate in substantially the same manner and produce substantially the same effect. Therefore, for convenience of understanding, operation of the present invention will hereinafter be described in detail, based on the circuit shown in FIG. 5, with reference to FIG. 6, which is a waveform diagram of voltages and currents across various components of FIG. 5.

The switching transistor 11 is, for example, an n channel type-junction field effect transistor, the gate of which is connected to the output terminal of the pulse width modulator (not shown). When the pulse signal from the pulse width modulator has a high level, the switching transistor 11 is turned on, because its drain-source voltage exceeds a threshold voltage. The drain-source voltage of switching transistor 11 is repeatedly changed from a high to a low level and vice versa, according to the level of the pulse signal from the pulse width modulator. As a result, the drain-source voltage of switching transistor 11 appears as high and low level digital pulses, as shown in FIG. 6. The amount of current flowing through choke coil 9 is increased for an interval (t1–t2) in which a drain-source current of switching transistor 11 flows as switching transistor 11 is turned on. The current flowing through choke coil 9 initially flows through switching transistor 11, and then in a charging direction of the capacitor 13 as a channel of switching transistor 11 proceeds to a pinch-off state. As a voltage across capacitor 13 is applied to the primary coil n1 of transformer 23, positive voltages are generated in first and second secondary coils n2 and n2' of transformer 23 during the interval t1–t2. The positive voltages generated in first and second secondary coils n2 and n2' of transformer 23 have levels between a supply voltage and a ground voltage, and are capable of turning on the first and second rectifying transistors 26 and 34, respectively.

In other words, the current flowing through choke coil 9 when switching transistor 11 is turned on is the same amount as that flowing through capacitor 13 when switching transistor 11 is turned off. In the case where the switching transistor 11 is turned on, the remaining current amount from the choke coil 9, other than a discharge current amount through the channel of the switching transistor 11, flows to the primary coil n1 of the transformer 23.

As a result, the first and second rectifying transistors 26 and 34 are turned on by gate voltages, as shown in FIG. 6, thereby causing the first and second DC voltages (DC1 and DC2) to be obtained. At this time, the fly-wheel transistor 28 is operated complementarily to the first rectifying transistor 26.

On the other hand, in cases where the switching transistor 11 is turned off, as it reaches the pinch-off state, namely, during the interval t2–t3, the current through the choke coil 9 is reduced in mount. In this case, a negative voltage is applied to the primary coil n1 of the transformer 23, thereby causing low level voltages to be applied to the gates of first and second rectifying transistors 26 and 34, respectively. On the contrary, a high level voltage is applied to the gate of the fly-wheel transistor 28, thereby causing fly-wheel transistor 28 to be turned on.

Although a waveform of the current flowing through choke coil 9 is shown in FIG. 6, which increases and decreases according to the ON/OFF states of the switching transistor 11, it may be constant regardless of the ON/OFF states of the switching transistor 11 by properly selecting the inductance of choke coil 9. Namely, the current through the choke coil 9 can be kept constant with respect to successive AC current levels. Therefore, the power factor can be enhanced.

As apparent from the above description, according to the present invention, the switching power supply does not require the boost rectifying diode included in the conventional circuit of FIG. 1B. Therefore, the switching power supply of the present invention can have a small power loss and an excellent conversion efficiency. Also, a field effect transistor is used instead of a diode as the secondary rectifying means, so that efficiency can be increased. Further, the switching power supply of the present invention can enhance the power factor with a simple circuit structure to cope with the requirement for reducing a harmonic current. Moreover, the simple circuit structure results in a cost reduction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A switching power supply comprising:

rectifying means, having an output terminal, for converting an alternating current (AC) input voltage into a direct current (DC) voltage and outputting the DC voltage to the output terminal;

inductance means, having a first electrode connected to the output terminal of said rectifying means and having a second electrode, for inducing a current based on the DC voltage output from said rectifying means;

switching means for switching between states to control a flow of current, said switching means connected between said second electrode of said inductance means and a ground voltage source;

capacitive means for holding a charge, said capacitive means having first and second electrodes, wherein the first electrode of said capacitive means is connected to said second electrode of said inductance means; and transforming means for transforming a voltage, said transforming means having a primary coil connected to said second electrode of said capacitive means, wherein said inductance means is a choke coil, and wherein the inductance value of said choke coil is selected so that when said switching means controls the current flow from said choke coil to said ground voltage source the current flowing through said choke coil is kept constant regardless of the switching state of said switching means.

2. A switching power supply as set forth in claim 1, wherein said switching means is a field effect transistor, said field effect transistor having a channel connected between said second electrode of said inductance means and said ground voltage source.

3. A switching power supply as set forth in claim 1, wherein said capacitive means is a capacitor.

4. A switching power supply as set forth in claim 1, further comprising:

a diode having an anode connected to a secondary coil of said transforming means; and a capacitor connected between a cathode of said diode and said ground voltage source.

5. A switching power supply as set forth in claim 1, further comprising:

a field effect transistor having a channel, said channel having first and second sides, wherein the first side of said channel is connected to a first side of a secondary coil of said transforming means, and a gate connected to a second side of said secondary coil of said transforming means; and a capacitor connected between the second side of said channel of said field effect transistor and said ground voltage source.

6. A switching power supply as set forth in claim 1, further comprising:

a first diode having an anode connected to a first side of a secondary coil of said transforming means;

a second diode having an anode connected to a second side of said secondary coil of said transforming means and a cathode connected to a cathode of said first diode;

a choke coil having a first electrode connected in common to the cathodes of said first and second diodes; and a capacitor connected between a second electrode of said choke coil and said ground voltage source.

7. A switching power supply as set forth in claim 1, wherein said transforming means includes first and second secondary coils and wherein said switching power supply further comprises:

a first diode having an anode connected to a first side of said first secondary coil of said transforming means;

a second diode having an anode connected to a second side of said first secondary coil of said transforming means and a cathode connected to a cathode of said first diode;

a choke coil having a first electrode connected in common to the cathodes of said first and second diodes;

a first capacitor connected between a second electrode of said choke coil and said ground voltage source;

a third diode having an anode connected to said second secondary coil of said transforming means; and a second capacitor connected between a cathode of said third diode and said ground voltage source.

8. A switching power supply as set forth in claim 1, further comprising:

a first transistor having a channel, said channel having a first side connected to a first side of a secondary coil of said transforming means, and a gate connected to a second side of said secondary coil of said transforming means;

a second transistor having a gate connected to said first side of said secondary coil of said transforming means and a channel, said channel of said second transistor having a first side connected to said ground voltage source and said channel of said second transistor having a second side connected to the a second side of said channel of said first transistor;

a choke coil having a first electrode connected in common to the second sides of said channels of said first and second transistors; and a capacitor connected between a second electrode of said choke coil and said ground voltage source.

9. A switching power supply as set forth in claim 1, wherein said transforming means includes first and second secondary coils and wherein said switching power supply further comprises:

a first transistor having a channel, said channel having a first side connected to a first side of said first secondary coil of said transforming means, and a gate connected to a second side of said first secondary coil of said transforming means;

a second transistor having a gate connected to said first side of said first secondary coil of said transforming means and a channel, said channel of said second transistor having a first side connected to said ground voltage source and a second side connected to a second side of said channel of said first transistor;

a choke coil having first and second electrodes, wherein said first electrode is connected in common to said second sides of said channels of said first and second transistors;

a first capacitor connected between said second electrode of said choke coil and said ground voltage source;

a third transistor having a channel, said channel of said third transistor having a first side connected to a first side of said second secondary coil of said transforming means, and a gate connected to a second side of said second secondary coil of said transforming means; and a second capacitor connected between a second side of said channel of said third transistor and said second side of said second secondary coil.

10. A switching power supply comprising:

a rectifier having input and output terminals, wherein an alternating current (AC) voltage is applied to the input terminal and a direct current (DC) voltage is output from the output terminal based on the AC voltage;

an inductor having a first electrode connected to the output terminal of said rectifier and having a second electrode, wherein said inductor induces a current based on the DC voltage output from said rectifier;

a switch connected between the second electrode of said inductor and a ground voltage source, wherein said switch switches between states to control a flow of current from said inductor to said ground voltage source;

a capacitor having a first electrode connected to said second electrode of said inductor; and a transformer having a primary coil connected to the second electrode of said capacitor: wherein the inductance value of said inductor is selected so that when said switch controls the current flow from said inductor to said ground voltage source the current flowing through said inductor is kept constant regardless of the switching state of said switch.

11. A switching power supply as set forth in claim 10, wherein said switch is a field effect transistor, said field effect transistor having a channel connected between said second electrode of said inductor and said ground voltage source.

12. A switching power supply as set forth in claim 10, further comprising:

a diode having an anode connected to a secondary coil of said transformer; and a capacitor connected between a cathode of said diode and said ground voltage source.

13. A switching power supply as set forth in claim 10, further comprising:

a field effect transistor having a channel, said channel having a first side connected to a first side of a secondary coil of said transformer, and a gate connected to a second side of said secondary coil of said transformer; and a capacitor connected between a second side of said channel of said field effect transistor and said ground voltage source.

14. A switching power supply as set forth in claim 10, further comprising:

a first diode having an anode connected to a first side of a secondary coil of said transformer;

a second diode having an anode connected to a second side of said secondary coil of said transformer and a cathode connected to a cathode of said first diode;

a choke coil having a first electrode connected in common to the cathodes of said first and second diodes; and a capacitor connected between a second electrode of said choke coil and said ground voltage source.

15. A switching power supply as set forth in claim 10, wherein said transformer includes first and second secondary coils and wherein said switching power supply further comprises:

a first diode having an anode connected to a first side of said first secondary coil of said transformer;

a second diode having an anode connected to a second side of said first secondary coil of said transformer and a cathode connected to a cathode of said first diode;

a choke coil having a first electrode connected in common to the cathodes of said first and second diodes:

a first capacitor connected between a second electrode of said choke coil and said ground voltage source;

a third diode having an anode connected to said second secondary coil of said transformer; and a second capacitor connected between a cathode of said third diode and said ground voltage source.

16. A switching power supply as set forth in claim 10, further comprising:

a first transistor having a channel, said channel having a first side connected to a first side of a secondary coil of said transformer, and a gate connected to a second side of secondary coil of said transformer;

a second transistor having a gate connected to said first side of said secondary coil of said transformer and a channel, said channel of said second transistor having a first side connected to said ground voltage source and a second side connected to a second side of said channel of said first transistor;

a choke coil having a first electrode connected in common to said second sides of said channels of said first and second transistors; and a capacitor connected between a second electrode of said choke coil and said ground voltage source.

17. A switching power supply as set forth in claim 10, wherein said transformer includes first and second secondary coils and wherein said switching power supply further comprises:

a first transistor having a channel, said channel of said first transistor having a first side connected to a first side of said first secondary coil of said transformer, and a gate connected to a second side of said first secondary coil of said transformer;

a second transistor having a gate connected to said first side of said first secondary coil of said transformer and a channel, said channel of said second transistor having a first side connected to said ground voltage source and a second side connected to a second side of said channel of said first transistor;

a choke coil having a first electrode connected in common to said second sides of said channels of said first and second transistors;

a first capacitor connected between a second electrode of said choke coil and said ground voltage source;

a third transistor having a channel, said channel of said third transistor having a first side connected to a first side of said second secondary coil of said transformer, and a gate connected to a second side of said second secondary coil of said transformer; and a second capacitor connected between a second side of said channel of said third transistor and said second side of said second secondary coil.

* * * * *